US012658384B2

(12) United States Patent
Chiang et al.

(10) Patent No.: US 12,658,384 B2
(45) Date of Patent: Jun. 16, 2026

(54) MOUSE WITH BUFFER STRUCTURE

(71) Applicant: SOLID YEAR CO., LTD., New Taipei City (TW)

(72) Inventors: Li-Yang Chiang, New Taipei City (TW); Yu-Hua Luo, New Taipei City (TW)

(73) Assignee: SOLID YEAR CO., LTD., New Taipei City (TW)

( * ) Notice: Subject to any disclaimer, the term of this patent is extended or adjusted under 35 U.S.C. 154(b) by 0 days.

(21) Appl. No.: 18/930,498

(22) Filed: Oct. 29, 2024

(65) Prior Publication Data

US 2026/0058076 A1 Feb. 26, 2026

(30) Foreign Application Priority Data

Aug. 23, 2024 (CN) .......................... 202422065204.5

(51) Int. Cl.
 H01H 13/26 (2006.01)
 G06F 3/0354 (2013.01)
 H01H 13/14 (2006.01)
(52) U.S. Cl.
 CPC ......... H01H 13/26 (2013.01); G06F 3/03543 (2013.01); H01H 13/14 (2013.01)
(58) Field of Classification Search
 CPC ..... H01H 13/26; H01H 13/14; G06F 3/03543
 See application file for complete search history.

(56) References Cited

U.S. PATENT DOCUMENTS

| 2001/0022578 | A1* | 9/2001 | Giles | ................... G06F 3/03543 |
| | | | | 345/163 |
| 2018/0136728 | A1* | 5/2018 | Unnikrishnan | ....... G06F 3/0202 |
| 2021/0193409 | A1* | 6/2021 | Yang | ..................... H01H 13/50 |

FOREIGN PATENT DOCUMENTS

JP 2006268615 A * 10/2006

* cited by examiner

*Primary Examiner* — Sahlu Okebato
(74) *Attorney, Agent, or Firm* — Birch, Stewart, Kolasch & Birch, LLP

(57) ABSTRACT

A mouse includes a main body, a button, a switch, and a special-shaped buffer. The main body has an accommodation space and a top opening communicating with the accommodation space. The button is mounted to the main body and fitted to the top opening. The switch is mounted in the accommodation space of the main body and has a trigger portion. The special-shaped buffer is disposed in the accommodation space of the main body and has a top end connected to the button through the top opening of the main body and a bottom end corresponding to the trigger portion of the switch. As such, when the button is pressed, the button drives the special-shaped buffer to press the trigger portion of the switch, so that the switch is triggered reliably.

11 Claims, 15 Drawing Sheets

10'

30

MOUSE WITH BUFFER STRUCTURE

BACKGROUND OF THE INVENTION

1. Field of the Invention

The present invention relates to computer mouses and more particularly, to a mouse that has a buffer structure.

2. Description of the Related Art

A mouse is one of the primary input devices for computers. For users who need to operate the mouse for extended periods, the tactile feedback of the button becomes particularly important. However, the traditional mouse suffers from issues due to tolerances between the button and the internal switch, leading to gaps that can cause instability. This instability may result in idle travel when the button is pressed, which affects the tactile feel and can also lead to wobbling or noise during use. Additionally, the switch might be inadvertently triggered even when the button is not pressed. Therefore, there is room for structural improvement in traditional mouse.

SUMMARY OF THE INVENTION

It is one objective of the present invention to provide a mouse, which has good tactile feedback and provides a more precise and responsive experience when performing a pressing action.

To attain the above objective, the mouse of the present invention comprises a main body, a button, a switch, and a special-shaped buffer. The main body has an accommodation space and a top opening communicating with the accommodation space. The button is pressably mounted to the main body and fitted to the top opening. The switch is mounted in the accommodation space of the main body and has a trigger portion. The special-shaped buffer is disposed in the accommodation space of the main body and has a top end connected to the button through the top opening of the main body and a bottom end corresponding to the trigger portion of the switch.

It can be seen from the above that when the button is pressed, the button drives the special-shaped buffer to press the trigger portion of the switch, such that the switch is triggered reliably. In other words, by providing the special-shaped buffer between the button and the switch, the mouse of the present invention can achieve effects of enhancing tactile feedback and ensuring a stable and reliable pressing action.

Preferably, the special-shaped buffer has a rib column provided with a top end connected to the button and a bottom end abutted against the trigger portion of the switch, and a special-shaped preloaded elastomer disposed in the rib column and having a top end abutted against a cantilever portion of the main body and a bottom end abutted against the bottom end of the rib column. In this way, when the button is pressed, the switch is triggered by the rib column.

Preferably, the special-shaped buffer has a rib column provided with a top end connected to the button, and a special-shaped preloaded elastomer disposed in the rib column and having a top end abutted against a cantilever portion of the main body and a bottom end protruding outside the rib column and abutted against the trigger portion of the switch. In this way, when the button is pressed, the switch is triggered by the special-shaped preloaded elastomer.

Other advantages and features of the present invention will be fully understood by reference to the following specification in conjunction with the accompanying drawings, in which like reference signs denote like components of structure.

DETAILED DESCRIPTION OF THE INVENTION

Figure 1:
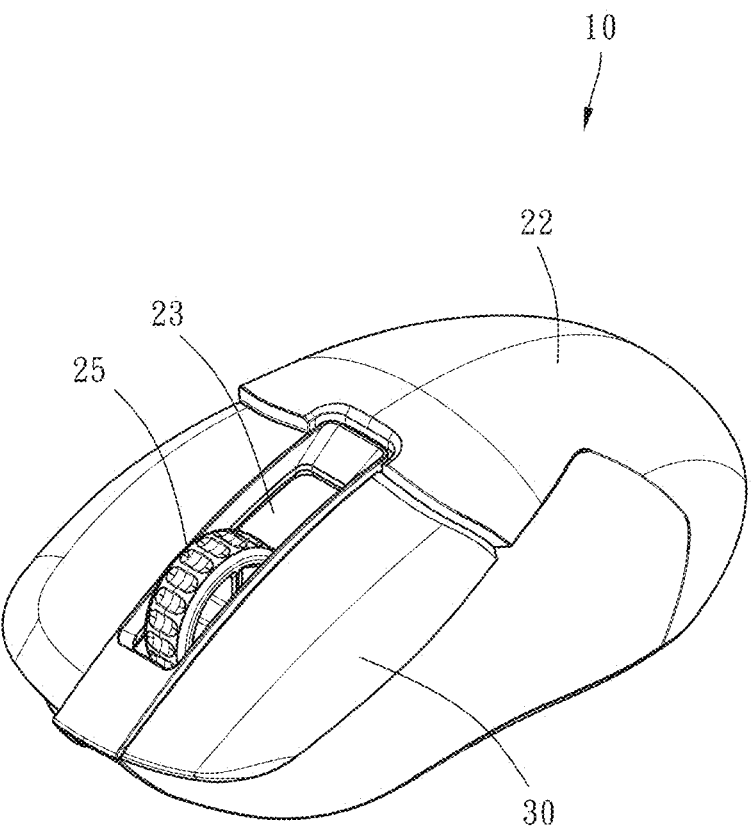
FIG. 1 is a perspective view of a mouse of a first embodiment of the present invention.
Figure 2:
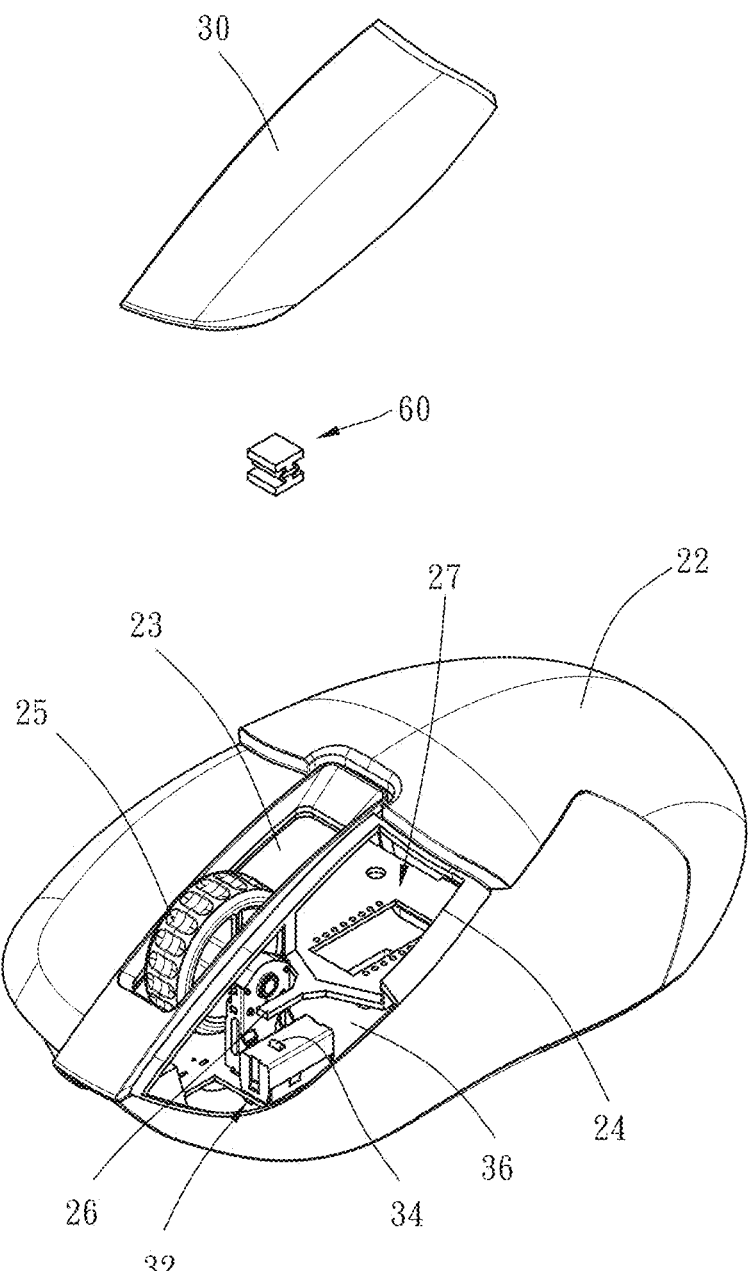
FIG. 2 is a partially exploded view of the mouse of the first embodiment of the present invention.

Referring to FIGS. 1-4, a mouse 10 of a first embodiment of the present invention comprises a main body 20, a button 30, a switch 32, and a special-shaped buffer 40.

The main body 20 includes a bottom shell 21 and a top shell 22 assembled with the bottom shell 21 to form an accommodation space 27 therebetween. The top shell 22 has a scroll wheel groove 23 and a top opening 24 adjacent to the scroll wheel groove 23. The scroll wheel groove 23 and the top opening 24 both communicate with the accommodation space 27, and the scroll wheel groove 23 is used for installation of a scroll wheel 25. In addition, the top shell 22 further has a cantilever portion 26 located below the top opening 24.

The button 30 is mounted on the top surface of the main body 20 and fitted to the top opening 24 for being pressed by a user' finger.

The switch 32 is connected to a circuit board 36 and disposed together with the circuit board 36 in the accommodation space 27 of the main body 20. A trigger portion 34 is provided on the top surface of the switch 32. The switch 32 can be triggered by pressing the trigger portion 34.

Figure 3:
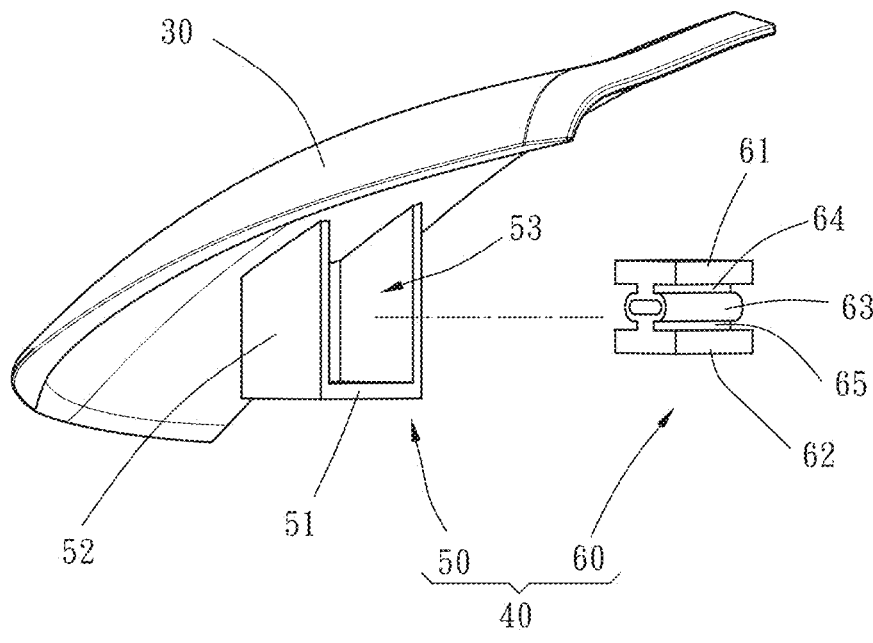
FIG. 3 is an exploded view of the button and the special-shaped buffer provided by the mouse of the first embodiment the present invention.

The special-shaped buffer 40 is disposed in the accommodation space 27 of the main body 20. As shown in FIG. 3, the special-shaped buffer 40 has a rib column 50 provided with a rectangular bottom wall 51 and a periphery wall 52 integrally connected to three sides of the bottom wall 51. The top end of the periphery wall 52 is connected to the bottom surface of the button 30 through the top opening 24 of the main body 20, such that an installation space 53 is formed between the button 30, the periphery wall 52, and the bottom wall 51. Additionally, the special-shaped buffer 40 further has a special-shaped preloaded elastomer 60 disposed in the installation space 53. In this embodiment, as shown in FIG. 3, the special-shaped preloaded elastomer 60 has a first large diameter portion 61 abutted against the cantilever portion 26 of the main body 20, a second large diameter portion 62 abutted against the bottom wall 51 of the rib column 50, an oval ring portion 63 located between the first and second large diameter portions 61, 62, a first small diameter portion 64 integrally connected to the first large diameter portion 61 and the oval ring portion 63, and a second small diameter portion 65 integrally connected to the second large diameter portion 62 and the oval ring portion 63. What needs to be supplemented is that the cantilever portion 26 is primarily used to contact the special-shaped preloaded elastomer 60. Therefore, any structure that achieves contact with the special-shaped preloaded elastomer 60 should be considered within the scope of the present invention. That is, the present invention is not limited to the cantilever portion 26.

Figure 4:
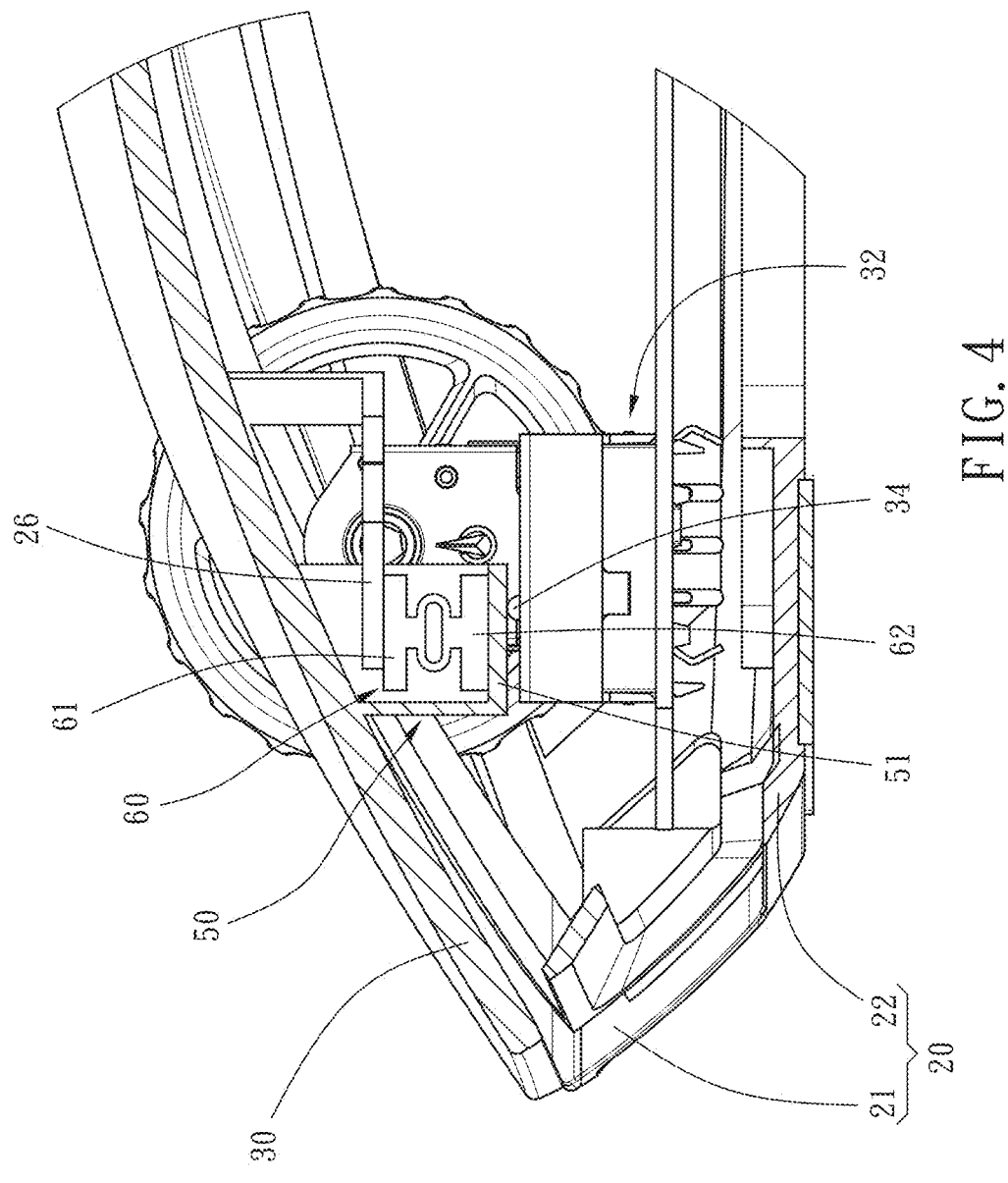
FIG. 4 is a sectional view of the mouse of the first embodiment of the present invention.
Figure 5:
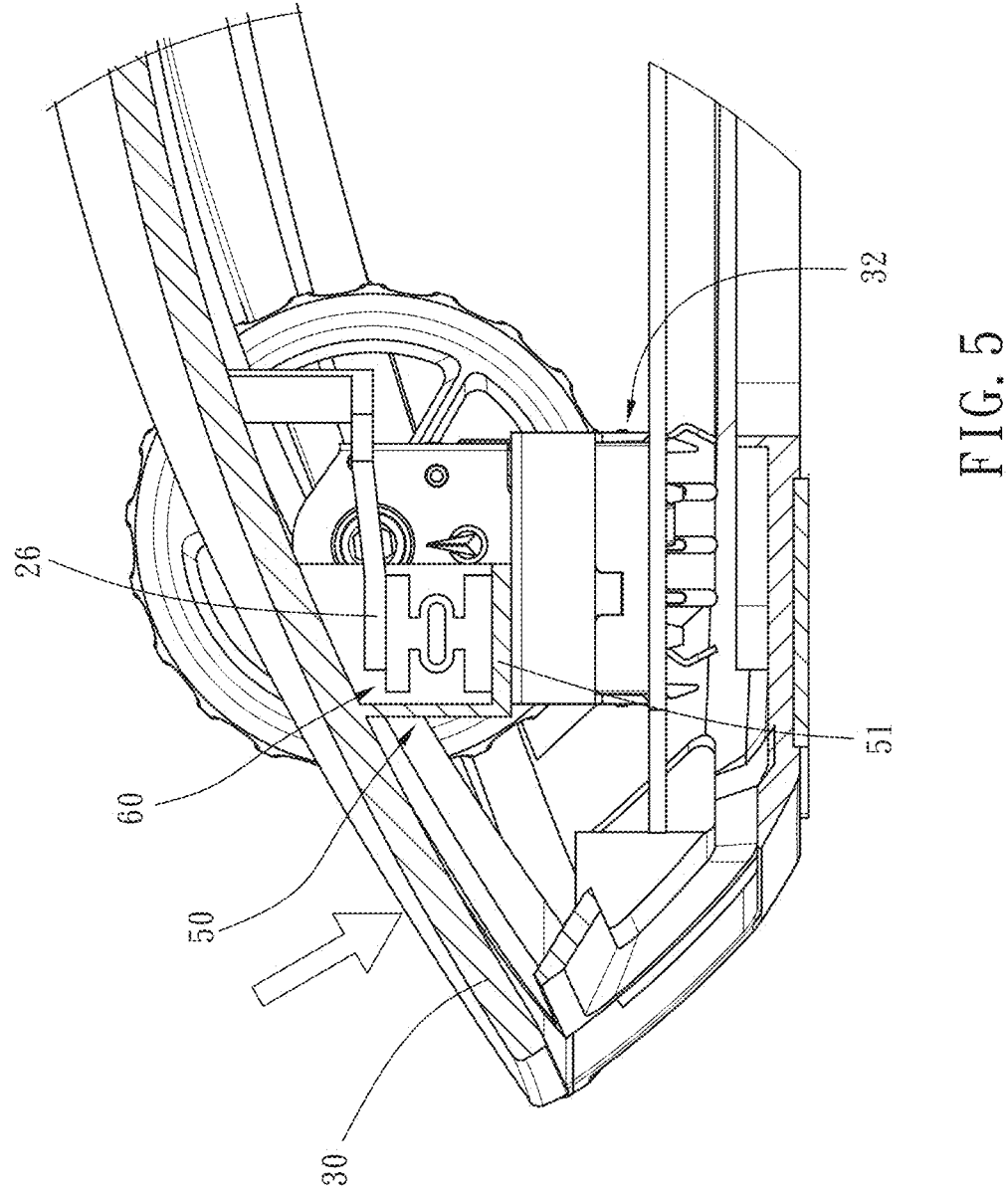
FIG. 5 is similar to FIG. 4, showing that the button triggers the switch through the special-shaped buffer.

It can be seen from the above that since the special-shaped preloaded elastomer 60 is preloaded during manufacturing, it can provide a stable pressure against the rib column 50 when the button 30 is not pressed, as shown in FIG. 4. This ensures that the rib column 50 remains in contact with the trigger portion 34 of the switch 32 without actually triggering the switch 32. When the button 30 is pressed, as shown in FIG. 5, the button 30 drives the rib column 50 to press the trigger portion 34 of the switch 32 downward, causing the switch 32 to be triggered. Once the pressing force on the button 30 is eliminated, the rebound force generated by the trigger portion 34 of the switch 32 pushes the button 30 upward through the rib column 50, so that the rib column 50 is returned to a state of mutual contact with the trigger portion 34 of the switch 32 by the stable pressure provided by the special-shaped preloaded elastomer 60, as shown in FIG. 4.

Figure 6:
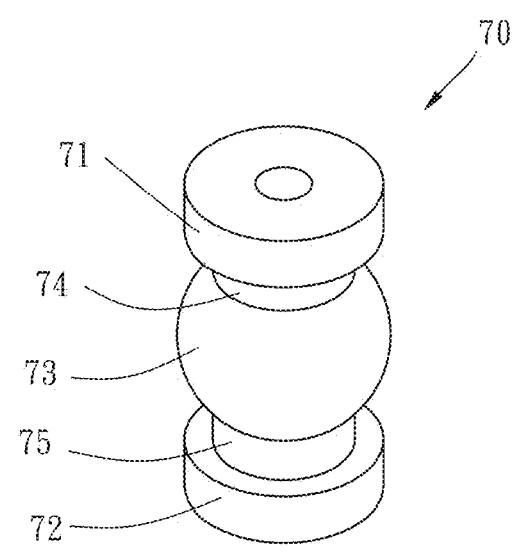
FIG. 6 is a perspective view of the special-shaped pre-loaded elastomer provided by the mouse of a second embodiment of the present invention.
Figure 8:
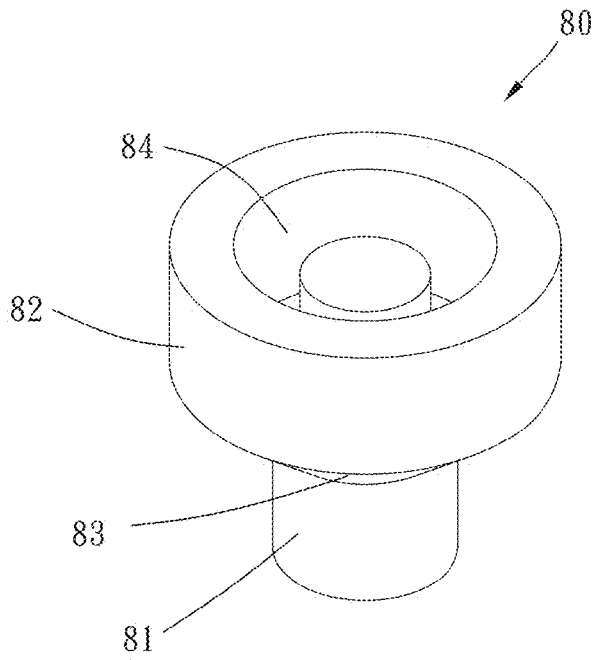
FIG. 8 is a perspective view of the special-shaped pre-loaded elastomer provided by the mouse of a third embodiment of the present invention.
Figure 7:
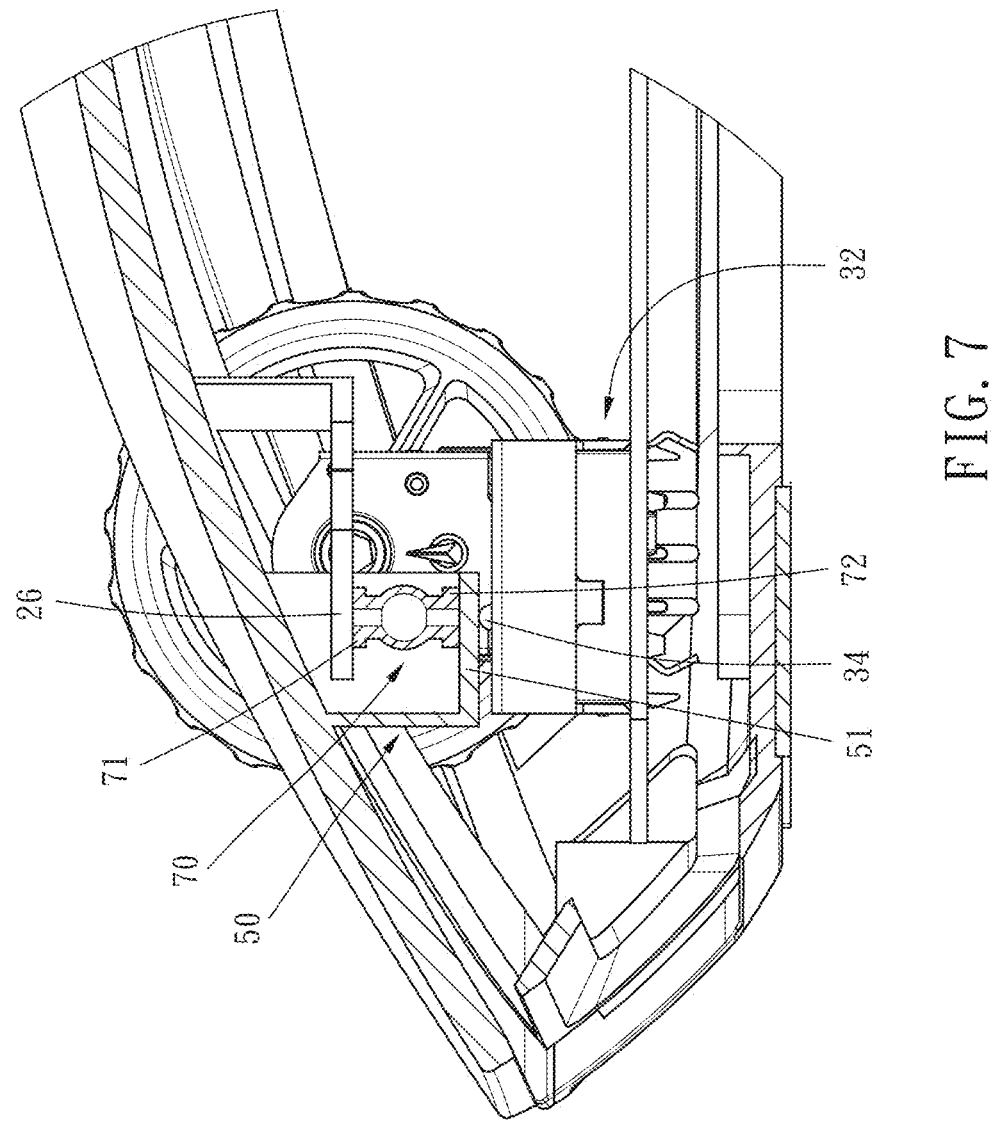
FIG. 7 is a sectional view of the mouse of the second embodiment of the present invention.
Figure 9:
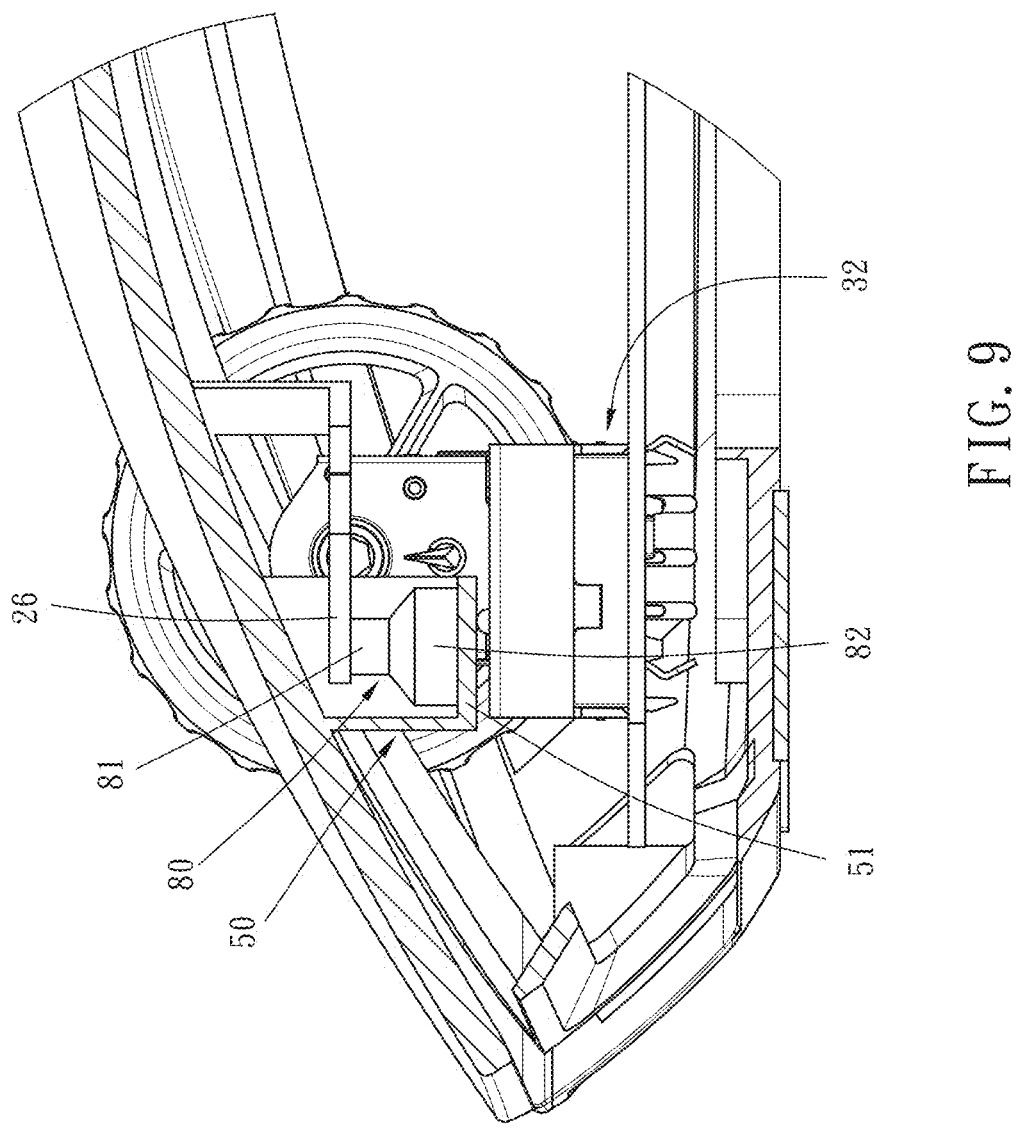
FIG. 9 is a sectional view of the mouse of the third embodiment of the present invention.

What needs to be supplemented is that the special-shaped preloaded elastomer may have different structural changes. For example, in the second embodiment, as shown in FIGS. 6-7, the special-shaped preloaded elastomer 70 has a first large diameter portion 71 abutted against the cantilever portion 26 of the main body 20, a second large diameter portion 72 abutted against the bottom wall 51 of the rib column 50, a spherical portion 73 located between the first and second large diameter portions 71, 72, a first small diameter portion 74 integrally connected to the first large diameter portion 71 and the spherical portion 73, and a second small diameter portion 75 integrally connected to the second large diameter portion 72 and the spherical portion 73. Further, the special-shaped preloaded elastomer 70 is hollow on the inside, so that the special-shaped preloaded elastomer 70 has sufficient deformation to enhance a buffering effect. Additionally, in the third embodiment, as shown in FIGS. 8-9, the special-shaped preloaded elastomer 80 has a small diameter portion 81 abutted against the cantilever portion 26 of the main body 20, a large diameter portion 82 abutted against the bottom wall 51 of the rib column 50 and provided with a concavity 84 to increase deformation, and a cone portion 83 integrally connected to the small diameter portion 81 and the large diameter portion 82 and having a diameter gradually increasing from the small diameter portion 81 to the large diameter portion 82. However, no matter which of the aforesaid special-shaped preloaded elastomers 60, 70, 80 is used, it can provide stable pressure to the rib column 50. This enables that the rib column 50 triggers the switch 32 when the button 30 is pressed, and enables that the rib column 50 remains in contact with the trigger portion 34 of the switch 32 without actually triggering the switch 32 when the button 30 is not pressed.

Figure 10:
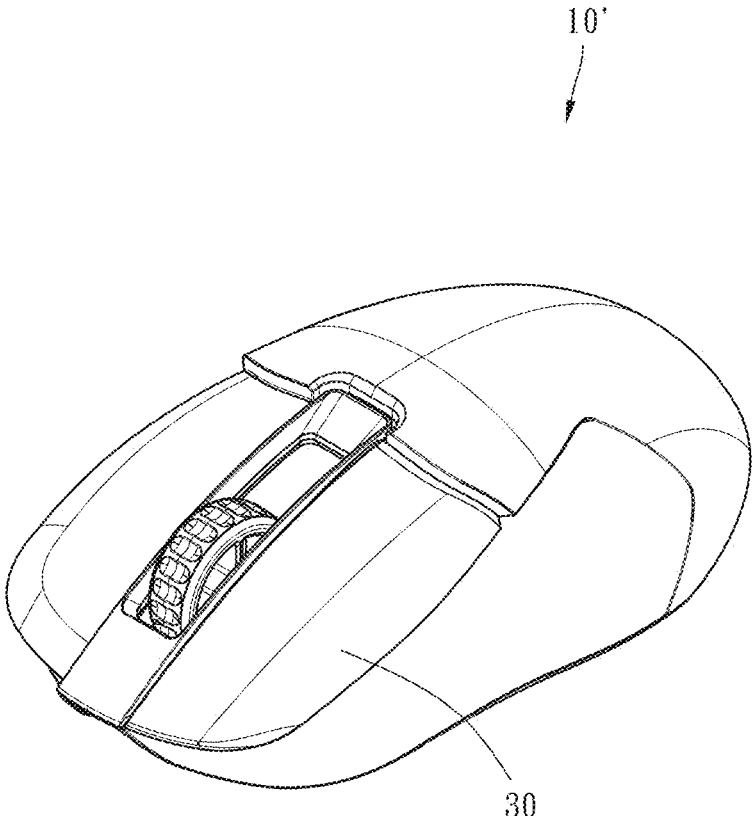
FIG. 10 is a perspective view of the mouse of a fourth embodiment of the present invention.

Please refer to FIG. 10, the main structure of the mouse 10' of the fourth embodiment is approximately the same with the first embodiment. In the first embodiment, the special-shaped buffer 40 allows the special-shaped preloaded elastomer 60 to indirectly trigger the switch 32 through the bottom wall 51 of the rib column 50. As to this embodiment, the special-shaped buffer 40' allows the special-shaped preloaded elastomer 60 to directly trigger the switch 32.

Figure 11:
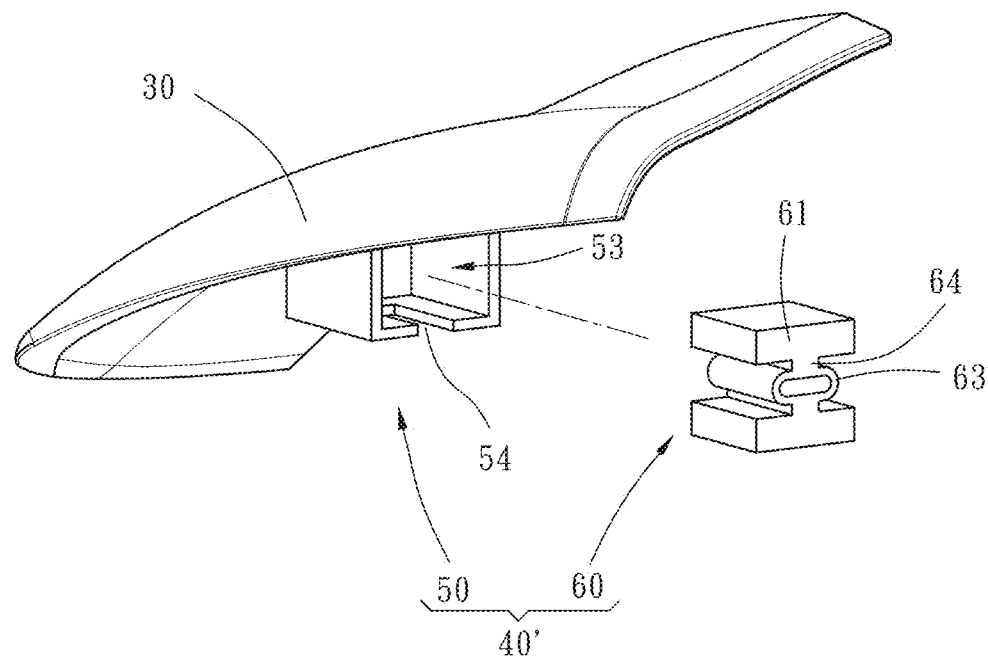
FIG. 11 is an exploded view of the button and the special-shaped buffer provided by the mouse of the fourth embodiment the present invention.
Figure 12:
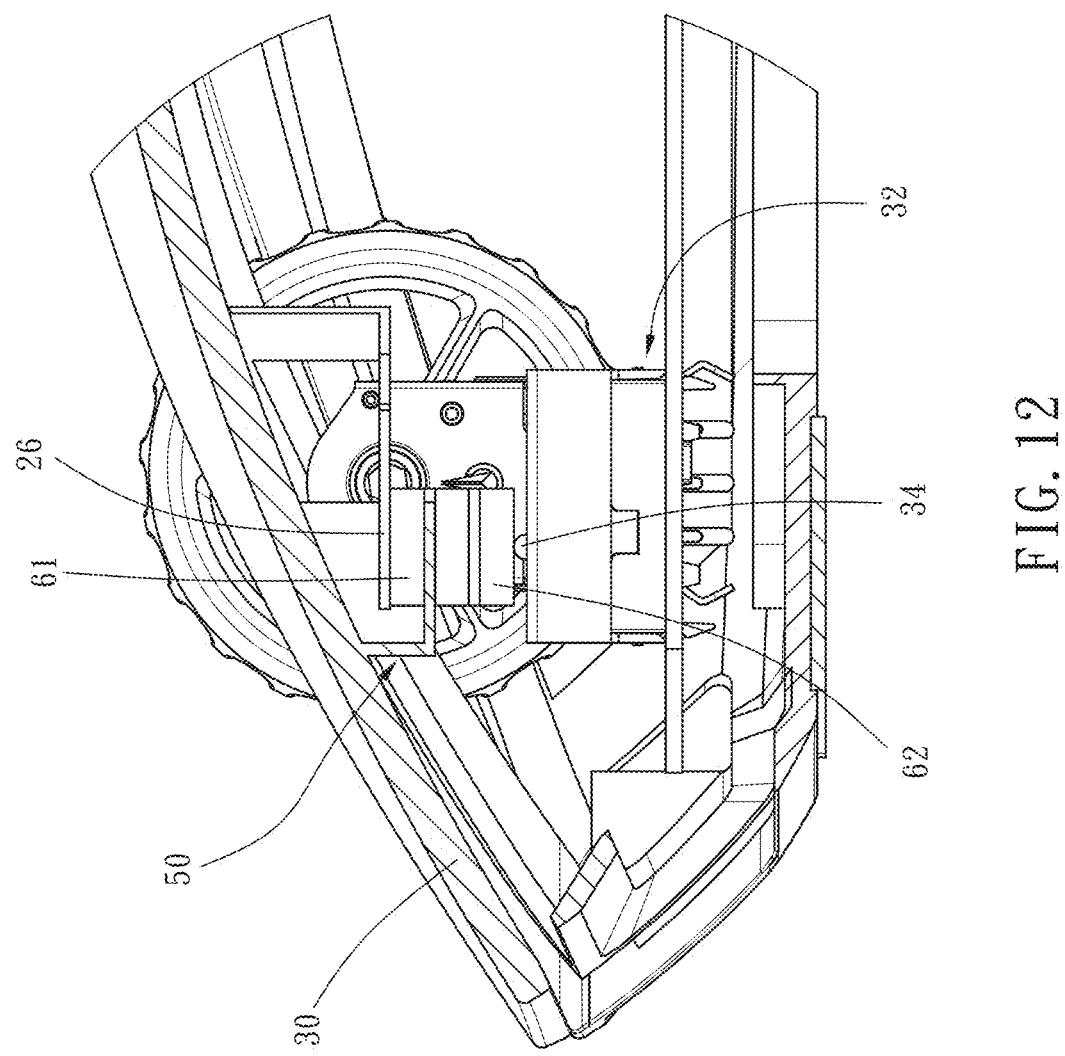
FIG. 12 is a sectional view of the mouse of the fourth embodiment of the present invention.

Furthermore, as shown in FIG. 11, the special-shaped buffer 40' also has a rib column 50 and a special-shaped preloaded elastomer 60. The bottom wall 51 of the rib column 50 has a notch 54 communicating with the installation space 53. The first small diameter 64 of the special-shaped preloaded elastomer 60 is engaged with the notch 54 of the bottom wall 51, so that the bottom wall 51 of the rib column 50 is engaged between the oval ring portion 63 and the first large diameter portion 61. As a result, as shown in FIG. 12, the first large diameter portion 61 of the special-shaped preloaded elastomer 60 is located in the installation space 53. The oval ring portion 63, the second small diameter portion 65, and the second large diameter portion 62 of the special-shaped preloaded elastomer 60 protrude outside the bottom end of the rib column 50. The second large diameter portion 62 of the special-shaped preloaded elastomer 60 is abutted against the trigger portion 34 of the switch 32.

Figure 13:
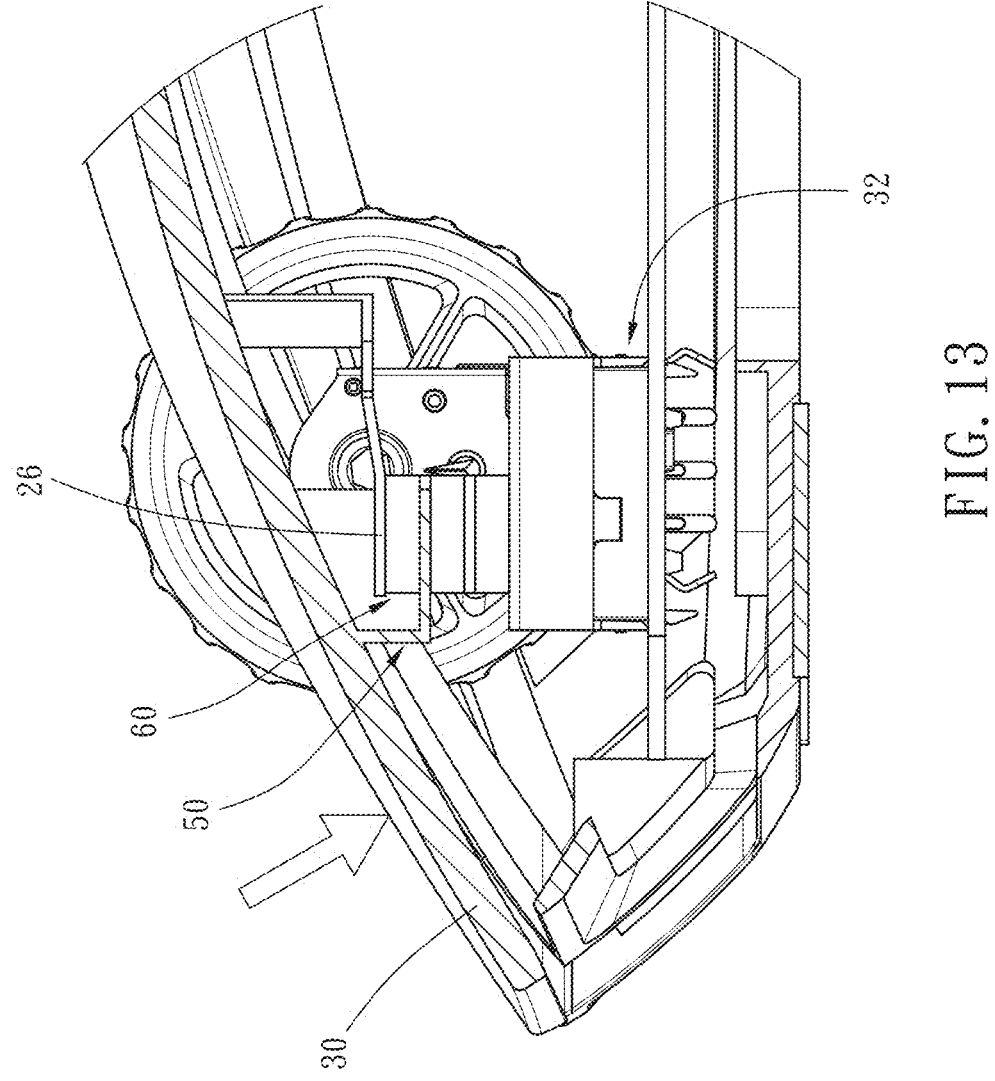
FIG. 13 is similar to FIG. 12, showing that the button triggers the switch through the special-shaped buffer.
Figure 14:
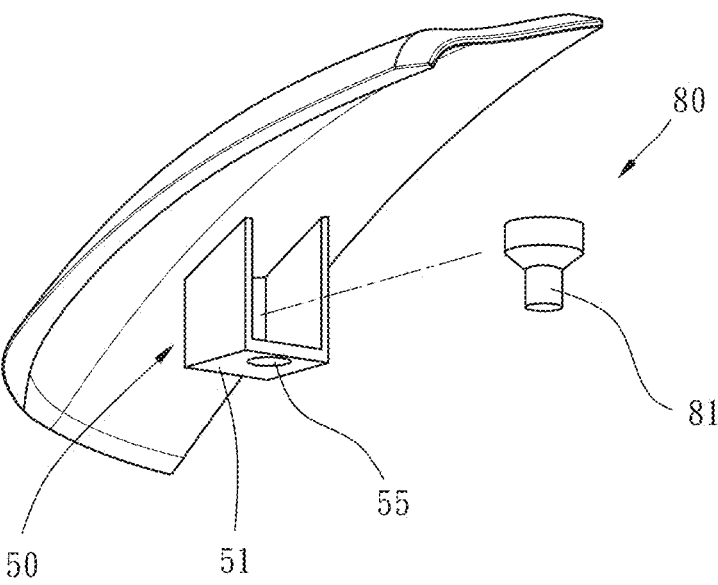
FIG. 14 is an exploded view of the button and the special-shaped buffer provided by the mouse of the fifth embodiment the present invention.

It can be seen from the above that since the special-shaped preloaded elastomer 60 is preloaded during manufacturing, the special-shaped preloaded elastomer 60 remains in contact with the trigger portion 34 of the switch 32 without actually triggering the switch 32 when the button 30 is not pressed, as shown in FIG. 12. When the button 30 is pressed, as shown in FIG. 13, the button 30 drives the rib column 50 to move downward. As the rib column 50 moves downward, it drives the special-shaped preloaded elastomer 60 to press the trigger portion 34 of the switch 32 downward through the engagement with the special-shaped preloaded elastomer 60, causing the switch 32 to be triggered. Once the pressing force on the button 30 is eliminated, the rebound force generated by the trigger portion 34 of the switch 32 pushes the button 30 upward through the special-shaped preloaded elastomer 60, so that the rib column 50 is compressed and returned to a state of mutual contact with the trigger portion 34 of the switch 32, as shown in FIG. 12.

What needs to be supplemented is that the special-shaped buffer 40' can also use the special-shaped preloaded elastomer 80 of the second embodiment. As shown in FIGS. 14-15, in order to match the special-shaped preloaded elastomer 80, the bottom wall 51 of the rib column 50 has a perforation 55. The small diameter portion 81 of the special-shaped preloading elastomer 80 is tightly fitted through the perforation 55, so that the small diameter portion 81 of the special-shaped preloading elastomer 80 is abutted against the triggering portion 34 of the switch 32. As a result, when the button 30 is pressed, the button 30 drives the rib column 50 to move downwards. As the rib column 50 moves downward, it drives the special-shaped preloaded elastomer 80 to press the trigger portion 34 of the switch 32 through the tight fit relationship between the perforation 55 and the small diameter portion 81 of the special-shaped preloaded elastomer 80, causing the switch 32 to be triggered.

Figure 16:
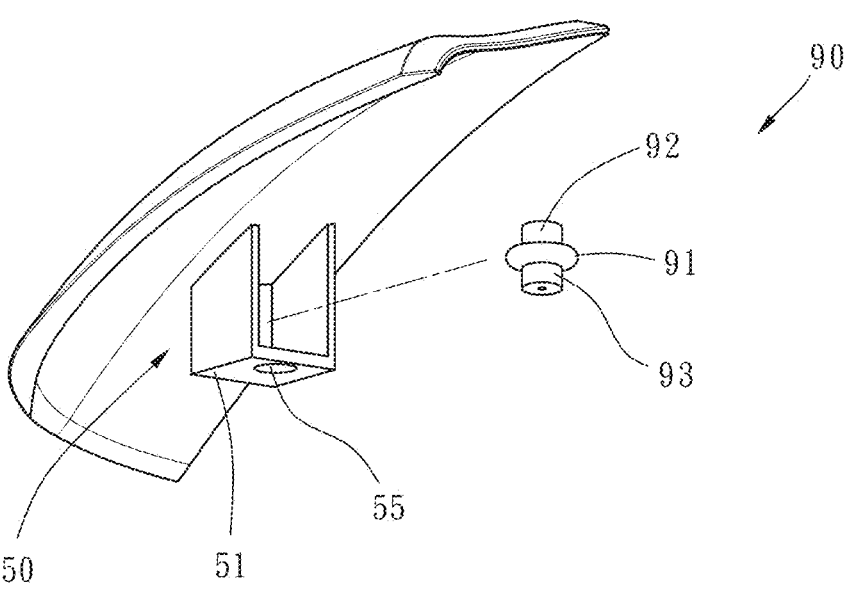
FIG. 16 is a sectional view of the mouse of the sixth embodiment of the present invention.
Figure 15:
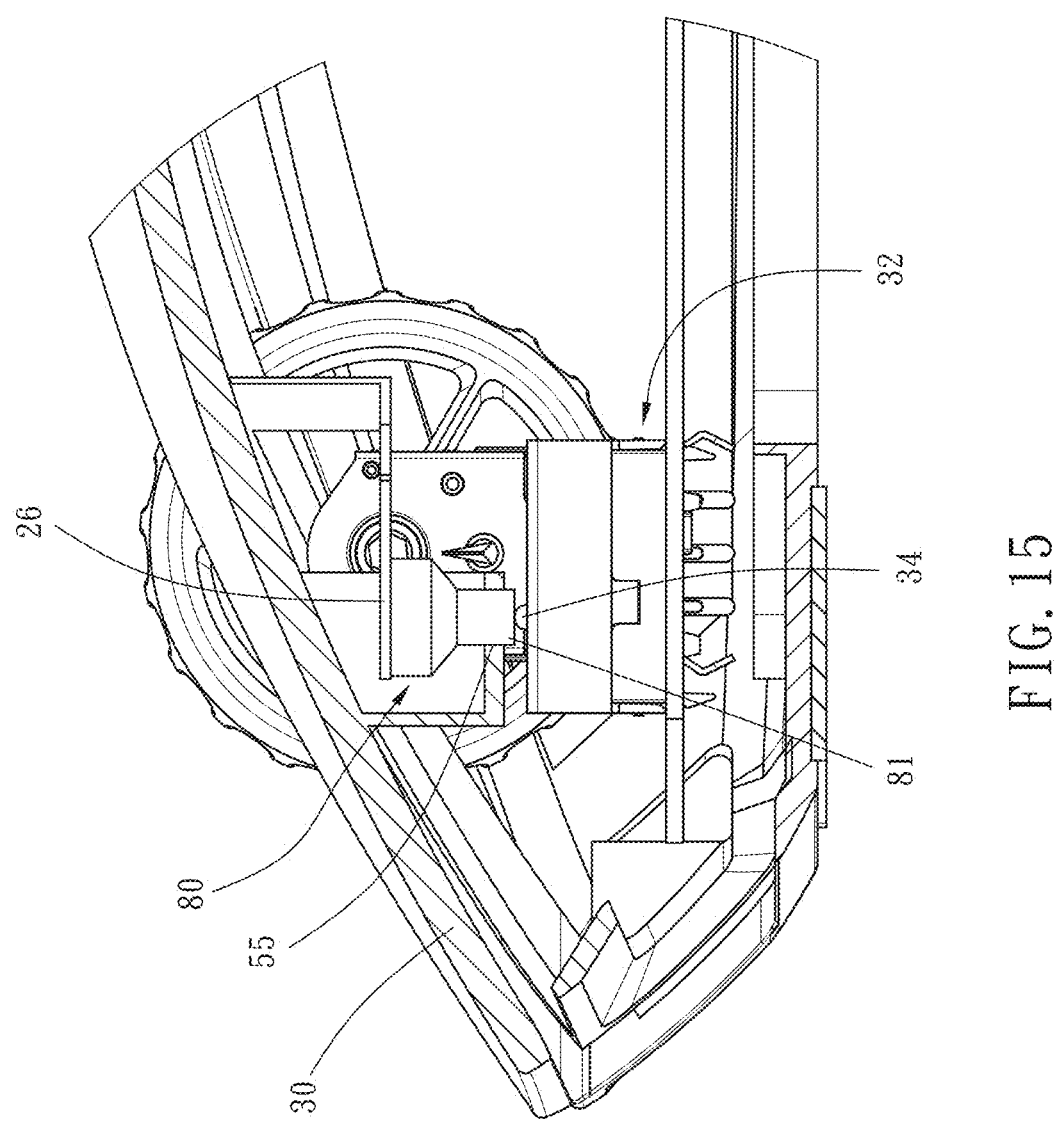
FIG. 15 is a sectional view of the mouse of the fifth embodiment of the present invention.
Figure 17:
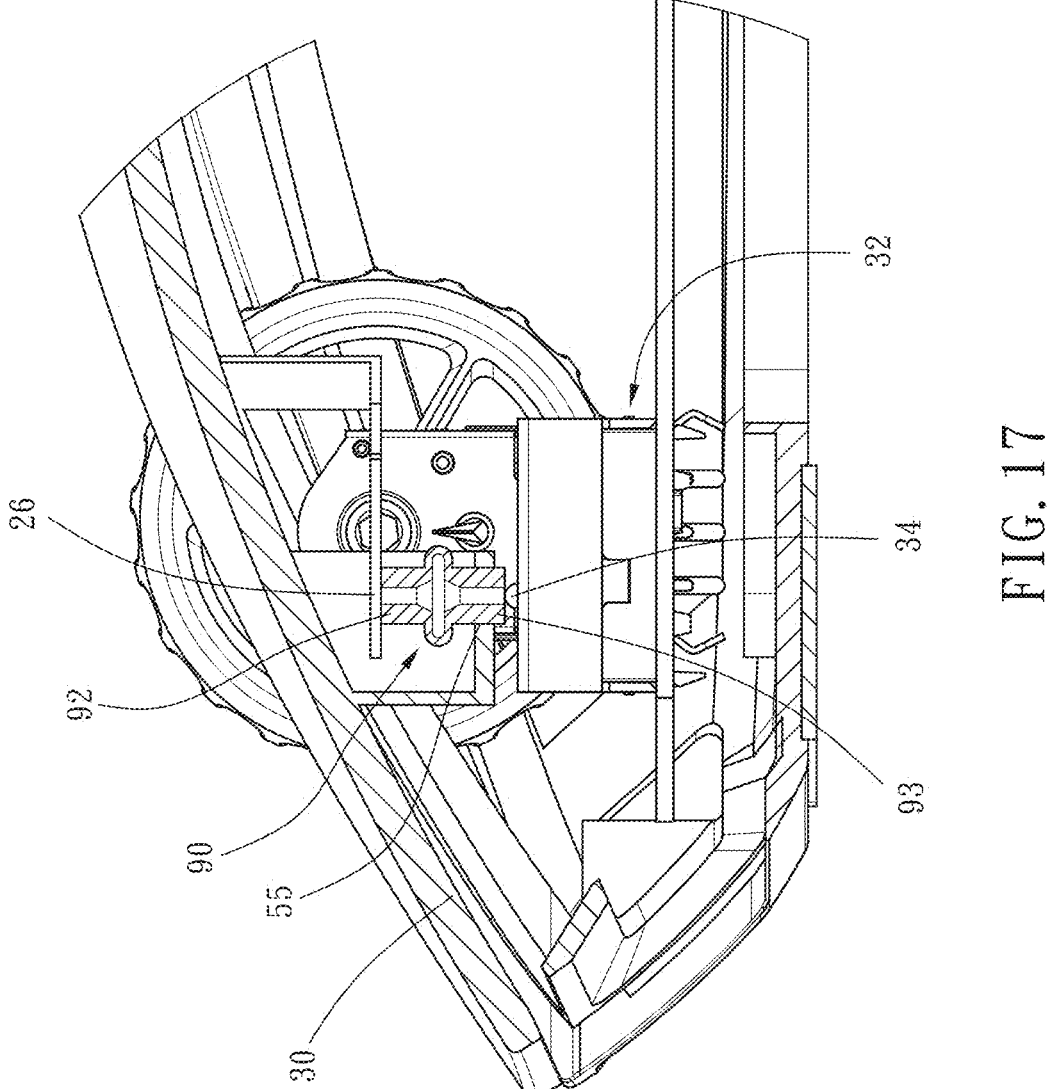
FIG. 17 is an exploded view of the button and the special-shaped buffer provided by the mouse of the sixth embodiment the present invention.

Similarly, in order to match the perforation 55 of the bottom wall 51 of the rib column 50, the special-shaped preloaded elastomer may have different structural changes. As shown in FIGS. 16-17, the special-shaped preloaded elastomer 90 has a first small diameter portion 92 abutted against the cantilever portion 26 of the main body 20, a second small diameter portion 93 tightly fitted through the perforation 55 and abutted against the trigger portion 34 of the switch 32, and a large diameter portion 91 integrally connected between the first and second small diameter portions 92, 93. As a result, when the button 30 is pressed, the button 30 drives the rib column 50 to move downward. As the rib column 50 moves downward, it drives the special-shaped preloaded elastomer 90 to press the trigger portion 34 of the switch 32 downward through the tight fit relationship between the perforation 55 and the second small diameter portion 93 of the special-shaped preloaded elastomer 90, causing the switch 32 to be triggered. Further, the special-shaped preloaded elastomer 90 is hollow on the inside, so that the special-shaped preloaded elastomer 90 has sufficient deformation to enhance a buffering effect.

As indicated above, by providing the special-shaped buffer 40, 40' between the button 30 and the switch 32, the mouse 10, 10' of the present invention not only enhances the tactile feedback of the button 30 during pressing, but also ensures that the button 30 reliably triggers the switch 32, resulting in a stable and accurate pressing action.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mouse comprising:
    a main body having an accommodation space and a top opening communicating with the accommodation space;
    a button pressably mounted to the main body and fitted to the top opening;
    a switch mounted in the accommodation space of the main body and having a trigger portion; and
    a special-shaped buffer disposed in the accommodation space of the main body and having a top end connected to the button through the top opening of the main body and a bottom end corresponding to the trigger portion of the switch, such that the special-shaped buffer can be driven by the button to press the trigger portion of the switch, thereby triggering the switch;
    wherein the special-shaped buffer has a rib column and a special-shaped preloaded elastomer;

6 wherein a top end of the rib column is connected to the button and defines an installation space together with the button for accommodating the special-shaped preloaded elastomer;
    wherein the main body has a cantilever portion that extends into the installation space and directly abuts against a top end of the special-shaped preloaded elastomer;
    wherein one of the rib column and the special-shaped preloaded elastomer is directly abutted against the trigger portion of the switch.

2. The mouse as claimed in claim 1, wherein a bottom end of the rib column is directly abutted against the trigger portion of the switch, and a bottom end of the special-shaped preloaded elastomer is abutted against the bottom end of the rib column.

3. The mouse as claimed in claim 2, wherein the rib column has a bottom wall abutted against the trigger portion of the switch and a periphery wall provided with top and bottom ends connected to the button and the bottom wall, respectively.

4. The mouse as claimed in claim 3, wherein the special-shaped elastomer is hollow on the inside, and has a first large diameter portion abutted against the cantilever portion of the main body, a second large diameter portion abutted against the bottom wall of the rib column, a spherical portion located between the first and second large diameter portions, a first small diameter portion integrally connected to the first large diameter portion and the spherical portion, and a second small diameter portion integrally connected to the second large diameter portion and the spherical portion.

5. The mouse as claimed in claim 3, wherein the special-shaped preloaded elastomer has a first large diameter portion abutted against the cantilever portion of the main body, a second large diameter portion abutted against the bottom wall of the rib column, an oval ring portion located between the first and second large diameter portions, a first small diameter portion integrally connected to the first large diameter portion and the oval ring portion, and a second small diameter portion integrally connected to the second large diameter portion and the oval ring portion.

6. The mouse as claimed in claim 3, wherein the special-shaped preloaded elastomer has a small diameter portion abutted against the cantilever portion of the main body, a large diameter portion abutted against the bottom wall of the rib column and provided with a concavity to increase deformation, and a cone portion integrally connected to the small diameter portion and the large diameter portion and having a diameter gradually increasing from the small diameter portion to the large diameter portion.

7. The mouse as claimed in claim 1, wherein the special-shaped preloaded elastomer has bottom end protruding outside the rib column and directly abutted against the trigger portion of the switch.

8. The mouse as claimed in claim 7, wherein the rib column has a bottom wall and a periphery wall provided with top and bottom ends connected to the button and the bottom wall, respectively, such that an installation space is formed between the button, the periphery wall, and the bottom wall; the special-shaped preloaded elastomer is partially located in the installation space and driven by the bottom wall of the rib column to press the trigger portion of the switch.

9. The mouse as claimed in claim 8, wherein the special-shaped preloaded elastomer has a first large diameter portion abutted against the cantilever portion of the main body, a second large diameter portion abutted against the trigger portion of the switch, an oval ring portion located between the first and second large diameter portions, a first small diameter portion integrally connected to the first large diameter portion and the oval ring portion, and a second small diameter portion integrally connected to the second large diameter portion and the oval ring portion; the bottom wall has a notch connected to the installation space and engaged with the first small diameter portion, such that the bottom wall is engaged between the oval ring portion and the first large diameter portion.

10. The mouse as claimed in claim 8, wherein the special-shaped preloaded elastomer has a large diameter portion abutted against the cantilever portion of the main body and provided with a concavity to increase deformation, a small diameter portion abutted against the trigger portion of the switch and tightly fitted through a perforation of the bottom wall, and a cone portion integrally connected to the large diameter portion and the small diameter portion and having a diameter gradually decreasing from the large diameter portion to the small diameter portion.

11. The mouse as claimed in claim 8, wherein the special-shaped preloaded elastomer is hollow on the inside, and has a first small diameter portion abutted against the cantilever portion of the main body, a second small diameter portion abutted against the trigger portion of the switch and tightly fitted through a perforation of the bottom wall, and a large diameter portion integrally connected between the first and second small diameter portions.

* * * * *